United States Patent
Laufer et al.

(10) Patent No.: US 10,767,800 B2
(45) Date of Patent: Sep. 8, 2020

(54) COUPLING ELEMENT FOR A COUPLING FOR CONNECTING PRESSURE MEDIUM LINES

(71) Applicant: U.M. GEWERBEIMMOBILIEN GMBH & CO. KG, Werdohl (DE)

(72) Inventors: Klaus Laufer, Meinerzhagen (DE); Christoph Ginczek, Marienheide (DE)

(73) Assignee: U.M. GEWERBEIMMOBILIEN GMBH & CO. KG, Werdohl (DE)

( * ) Notice: Subject to any disclaimer, the term of this patent is extended or adjusted under 35 U.S.C. 154(b) by 0 days.

(21) Appl. No.: 15/776,852

(22) PCT Filed: Nov. 14, 2016

(86) PCT No.: PCT/EP2016/077528
§ 371 (c)(1),
(2) Date: May 17, 2018

(87) PCT Pub. No.: WO2017/084992
PCT Pub. Date: May 26, 2017

(65) Prior Publication Data
US 2018/0328526 A1    Nov. 15, 2018

(30) Foreign Application Priority Data

Nov. 17, 2015 (DE) .......................... 10 2015 222 640

(51) Int. Cl.
*F16L 37/34* (2006.01)
*F16L 37/23* (2006.01)
(52) U.S. Cl.
CPC .............. *F16L 37/34* (2013.01); *F16L 37/23* (2013.01); *Y10T 137/87949* (2015.04)
(58) Field of Classification Search
CPC .... F16L 37/23; F16L 37/34; Y10T 137/87949
(Continued)

(56) References Cited

U.S. PATENT DOCUMENTS 4,447,040 A * 5/1984 Magorien ............... F16L 37/32
137/508
5,709,243 A 1/1998 Wells et al.
(Continued)

FOREIGN PATENT DOCUMENTS

DE          88 09 220 U1    9/1988
DE   10 2010 019 094 A1   11/2011
(Continued)

OTHER PUBLICATIONS

International Search Report of PCT/EP2016/077528 dated Feb. 1, 2017 (English Translation).

*Primary Examiner* — Kevin L Lee
(74) *Attorney, Agent, or Firm* — Dickinson Wright PLLC

(57) ABSTRACT

The invention relates to a coupling element (1) for a coupling for connection of pressure medium lines, including a housing (2), a flow channel (5) for a pressure medium, a valve tappet (6), a pressure sleeve (7), and an inner body (8), wherein the valve tappet (6) has a valve tappet head (10), wherein the pressure sleeve (7) surrounds the valve tappet (6), wherein the pressure sleeve (7) is held such that it can move along the coupling axis A between a closed position and an open position, wherein the pressure sleeve (7) is in contact with the valve tappet head (10) in the closed position thereof, whereby a force parallel to the coupling axis A acts upon the valve tappet head (10) from the pressure sleeve (7). The safety for users and the operating characteristics are improved, in that the inner body (8) and/or the pressure sleeve (7) have means with which the force from the pressure sleeve (7) acting on the valve tappet head (10) can be limited.

16 Claims, 5 Drawing Sheets

(58) Field of Classification Search
USPC .................................................. 137/614.03
See application file for complete search history.

(56) References Cited

U.S. PATENT DOCUMENTS

| | | | |
|---|---|---|---|
| 6,814,340 B2 | 11/2004 | Arosio | |
| 8,469,406 B2 | 6/2013 | Takahashi | |
| 9,291,293 B2 | 3/2016 | Prust et al. | |
| 2010/0327574 A1 | 12/2010 | Takahashi | |
| 2013/0206261 A1* | 8/2013 | Prust et al. | F16L 37/34 |
| | | | 137/798 |

FOREIGN PATENT DOCUMENTS

| | | |
|---|---|---|
| EP | 1 273 844 B1 | 12/2004 |
| EP | 2 148 122 A1 | 1/2010 |

* cited by examiner

COUPLING ELEMENT FOR A COUPLING FOR CONNECTING PRESSURE MEDIUM LINES

CROSS-REFERENCE TO RELATED APPLICATIONS

This application is a 35 U.S.C. § 371 national phase application of PCT International Application No. PCT/EP2016/077528, filed Nov. 14, 2016, which claims the benefit of priority under 35 U.S.C. § 119 to German Patent Application No. 10 2015 222 640.9, filed Nov. 17, 2015, the contents of which are incorporated herein by reference in their entirety.

FIELD OF THE INVENTION

The invention relates to a coupling element for a coupling, in particular a hydraulic coupling, for connecting pressure medium lines. Furthermore, the invention relates to a valve tappet for a coupling element.

Coupling elements for couplings, in particular for hydraulic couplings, are known in the state of the art in a plurality of designs. Hydraulic couplings, namely a combination of a coupling sleeve and a coupling plug, serve to connect two sections of a pressure medium line, and are often used to connect hydraulic equipment to a hydraulic source, for example to connect a tool or accessory to a farming machine or construction machine.

Coupling elements in which the flow channel is sealed by a centrally supported pressure sleeve, in that the pressure sleeve is in at least indirect contact with the valve tappet head of the valve tappet when in its closed position, are known in the state of the art. Here a seal is located between the valve tappet head and the pressure sleeve.

For example, such a hydraulic coupling having a coupling element in which a pressure sleeve for closing a flow channel abuts on the valve tappet head of a valve tappet is known from EP 1 273 844 BI. The pressure sleeve is biased by a spring in the direction of its closed position and works together at least partially via a seal with the valve tappet head.

In order to open the flow channel in accordance with EP 1 273 844 B1, the pressure sleeve is moved out of its closed position in the direction of its open position, for under the impact of a coupling plug that is for example inserted into a coupling sleeve, whereby the flow channel is opened. Movement of the pressure sleeve from the closed position into the open position always takes place against the force of the spring which forces the pressure sleeve in its closed position. In the closed position, the pressure sleeve fits against the valve tappet head and exerts a force on the valve tappet parallel to the coupling axis of the coupling element. This force is composed, amongst others, of the spring load on the pressure sleeve and the pressure-dependent forces on the pressure sleeve in the direction of its closed position.

The coupling elements known in the state of the art involve the risk that, under very high pressure, especially upon reaching the bursting pressure of the coupling element, parts of the coupling element come loose or tear away, which constitutes a safety hazard for individuals standing nearby.

Object of the present invention is therefore providing a coupling element and a valve tappet, wherein the safety for the user is increased while simultaneously preserving or improving the operating characteristics of the coupling element.

INTRODUCTORY DESCRIPTION OF EMBODIMENTS OF THE INVENTION

The aforementioned object is solved with a generic coupling element in that the inner body and/or the pressure sleeve has/have a feature by which the force(s) acting upon the valve tappet head from the pressure sleeve can be limited. To limit, in this context, always means both an absolute limitation to a fixed threshold value, and a percentage reduction of the force.

The coupling element is a part of a coupling, in particular a hydraulic coupling, for connecting pressure medium lines and is formed, for example, as a coupling sleeve or as a coupling plug. A coupling thereby comprises a coupling sleeve as well as a coupling plug, respectively wherein the coupling plug is inserted into the coupling sleeve in order to connect the flow channels of the coupling sleeve and coupling plug with each other. The coupling element preferably has a nominal width of 19, 16, or 12.5 mm.

The coupling element can be connected with a corresponding second coupling element by use of, for example, a screw connection or snap connection. The coupling element includes a housing, a flow channel for a pressure medium, a valve tappet, a pressure sleeve, and an inner body.

The housing of the coupling element has a central coupling axis A, which extends between a first end of the coupling element, to which a pressure medium line can be connected, and a second end, at which the connection with the further coupling element of a coupling takes place. Preferably, the components of the coupling element are rotationally symmetrical around coupling axis A. For example, the inner body or, in case of a coupling sleeve, the inner body is formed rotationally symmetrical and sleeve-like Further, a movement of movable components of the coupling element preferably always takes place parallel to coupling axis A.

In particular, the housing limits at least a part of the flow channel, wherein the further course of the flow channel favorably is limited by the additional components of the coupling element. For example, the flow channel is limited at least by the housing, the inner body, and the pressure sleeve.

Preferably, the housing comprises a connecting component and a sliding sleeve. The connecting component is preferably screwed to a base body, wherein the base body simultaneously fixes the inner body to the connecting component. The base body preferably is also formed sleeve-like. Advantageously, a seal is placed between the inner body and the connecting component, especially on one abutting face of the inner body. The external sliding sleeve is retained on the base body slidable fashion between an open position and a retaining position. The base body in turn surrounds the inner body.

Preferably, a plurality of circumferential recesses is provided in the base body, into which retaining elements, in particular retaining balls, are located. In the open condition, the retaining elements are located in the recesses of the base body and work together with an associated inside circumferential groove in the sliding sleeve, so that the sliding sleeve is held positively in its open position. A sleeve spring, for example, is arranged between the base body and the sliding sleeve, which forces the sliding sleeve in its open position against the retaining elements into the direction of the sliding sleeve's locked position. Further movement of the sliding sleeve is in this condition prevented by the retaining elements. The coupling element additionally includes a piston which is guided inside of the base body and prevents motion of the retaining elements when the sliding sleeve is in open position.

When the piston is shifted into the direction of the inner body, for example due to the introduction of a corresponding second coupling element into the first coupling element, e.g. a coupling plug into a coupling sleeve; from a certain position of the piston the locking of the retaining elements at first is taken on by a portion of the second coupling element, until the retaining balls can recede into an outside circumferential groove of the second coupling element. At this moment, the locking sleeve, which is now released to move, is forced into its locking position by the sleeve spring, wherein the retaining elements are subsequently blocked by a locking area of the sliding sleeve. The sliding sleeve thereby moves until it contacts a blocking element located on the base body, locked position of the sliding sleeve. The retaining element, for example, is formed as a circlip placed in the base body on its outer circumference.

In order to separate the coupling elements of a coupling which are connected in this manner, the sliding sleeve is to be manually moved into its open position against the force of the sleeve spring, whereby the retaining elements can once again recede into the inside circumferential groove of the locking sleeve, and thus enable disconnecting the second coupling element.

The valve tappet is held within the coupling element in such a manner that the valve tappet is arranged centrally in the flow channel. Consequently, the flow channel surrounds the valve tappet located within the flow channel, so that the pressure medium flows around particularly, the shaft of the valve tappet and the valve tappet head during operation. It is preferable that the valve tappet head is a part of the flat-sealing abutting face on the second end of the coupling element.

The valve tappet is located in such a manner that it is surrounded by the inner body and the pressure sleeve. Preferably, the pressure sleeve is guided within the inner body, which is connected with the housing in a fixed or floating manner, in such a way that the pressure sleeve can be slid parallel to coupling axis A between a closed position, in which the flow channel is sealed by the pressure sleeve, and an open position, in which the flow channel is opened by the pressure sleeve. Particularly, a compression spring is provided, which exerts a force on the pressure sleeve in the direction of its closed position, so that the pressure sleeve is always urged into its closed position by the compression spring.

In the pressure sleeve's closed position, a sealing of the flow channel is effected in that the pressure sleeve at least indirectly contacts the valve tappet head. It is thereby provided for that the pressure sleeve directly, indirectly; for example via a seal; or partially directly and partially indirectly contacts the valve tappet head. Preferably, a seal is always provided between the pressure sleeve and the valve tappet head. The seal is arranged in a circumferential groove in the valve tappet head, for example. Preferably, the seal rests against the inside circumference of the pressure sleeve.

The pressure sleeve is designed and located so that it contacts the valve tappet head in such a manner that a force from the pressure sleeve parallel to the coupling axis A acts on the valve tappet head. This force in particular is composed of the force of the compression spring acting on the pressure sleeve and force components resulting from pressurized pressure medium being present in the flow channel, which acts on the pressure sleeve and exerts a force on the pressure sleeve in the direction of the valve tappet head.

When pressure is applied in the closed flow channel, the valve tappet is thus loaded on the one hand by the pressure being effective upon it, and on the other hand by the force applied by the pressure sleeve. As pressure increases within the flow channel, for example, the shaft of the valve tappet stretches due to the axial tension, which if the force on the valve tappet is not moderated can result in the valve tappet head or the valve tappet tearing off in the region of the shaft or in the region of the mounting area of the valve tappet.

In order to limit the force/forces exerted, particularly, parallel to coupling axis A, by the pressure sleeve upon the valve tappet, the inner body and/or the pressure sleeve includes means by which the force can be limited. For example, would be it is provided that the means on the inner body and/or the pressure sleeve act in such a manner that the force of the pressure sleeve upon the valve tappet head is limited, in that at least a portion of the force/forces from the pressure sleeve is transferred to the inner body. The force is transferred from the inner body to the housing. By limiting the force a destruction of the valve tappet is prevented reliably and thus the operational safety of the coupling element increased.

In particular it is provided that the inner body and/or on the pressure sleeve are informed such the force acting upon the valve tappet head is limited and reduced respectively in at least one operating state of the coupling element. For example, it is provided that beyond a predetermined threshold value of pressure within the coupling element, the force exerted by the pressure sleeve upon the valve tappet head is limited or reduced by the means.

Usual operating pressures for a coupling element are between 25 MPa and 40 MPa, in particular the operating pressure is 35 MPa. Preferably, it is intended that the predetermined threshold value for pressure within the coupling element, beyond which the force is limited or reduced by the means, lies in the range between operating pressure and 4 times operating pressure, particularly between 1.5 and 2 times operating pressure.

Particularly preferred, means for limiting the force of the pressure sleeve upon the valve tappet head are provided for both at the inner body and on the pressure sleeve. Particularly, the means are constructed and implemented that the means at the inner body and the features on the pressure sleeve work together to limit or reduce the force from the pressure sleeve upon the valve tappet head.

It is advantageously provided that the features in the inner body and/or the features on the pressure sleeve are constructed and implemented that a movement of the pressure sleeve in the direction of the valve tappet head can be limited by the means.

The inventive coupling element has the advantage of reducing the risk of overloading the valve tappet using the means, in that the force from the pressure sleeve acting upon it is limited by the means in at least one operating condition, particularly beyond at least one operating condition, whereby destruction of the valve tappet is prevented. The forces emanating from the pressure sleeve are distributed between the valve tappet head and the inner body by the means.

Additionally, the inventive coupling element has the advantage that using lower cost materials leads to the same operating parameters, such as operating pressure and bursting pressure. Furthermore, there is the advantage that when using the same materials compared to known constructions higher operating parameters can be achieved, and with higher-quality materials even greater operating parameters.

In accordance with a first embodiment of the coupling element, it is provided that the means in the inner body is designed as a first limit stop and the means on the pressure sleeve as a second limit stop, wherein the first limit stop and the second limit stop work together to limit the force upon the valve tappet, in particular upon the valve tappet head.

Preferably, the pressure sleeve is guided within the inner body. In order to limit or reduce the force of the pressure sleeve upon the valve tappet head, a respective limit stop is provided for in the inner body as well as on the pressure sleeve. The first limit stop and the second limit stop contact in at least one operating state, in particular as of at least one operating state of the coupling element, so that force can be transferred from the pressure sleeve to the inner body, whereby a portion of the forces exerted on the pressure sleeve in the direction of the valve tappet head is transferred by via the first or second limit stop by the inner body, which is affixed to the housing. The force from the pressure sleeve upon the valve tappet is thereby limited, which is especially advantageous in the case of high pressures within the flow channel, especially pressures over and beyond operating pressure.

The first limit stop and the second limit stop are formed, for example, as local protrusions, which extend from the inner body or the pressure sleeve. It is preferable that a plurality of regularly distributed protrusions is provided, which constitute the first or the second limit stop.

According to a further embodiment it turned out to be particularly advantageous when the first limit stop is designed as a first shoulder on the inner body and the second limit stop is designed as a second shoulder on the pressure sleeve. The first shoulder on the inner body and the second shoulder on the pressure sleeve are preferably formed circumferentially, so that an even distribution of force from the pressure sleeve to the inner body can be achieved around the entire circumference of both shoulders.

The first and second shoulders have corresponding contact surfaces, so that the force from the pressure sleeve on the valve tappet can be limited through contact between the contact surfaces. It is preferable that the corresponding contact surfaces are in an orthogonal orientation to the coupling axis of the coupling element. The first shoulder is located on the end portion of the inner body which is oriented in the direction of the valve tappet head and preferably has a rectangular cross-section. It is advantageous to have an additional sealing shoulder in the inner body, and to include a seal between the first shoulder and the sealing shoulder, which functions between an interior circumference of the inner body and an exterior circumference of the pressure sleeve. The first shoulder then serves on the one hand to absorb forces from the pressure sleeve and on the other hand as a stop of a groove for the seal.

The second shoulder is preferably located on the end portion of the pressure sleeve which is oriented in the pressure sleeve's open position. As an example, the second shoulder has a rectangular cross-section. It is preferable that the second shoulder forms at least a part of the circular abutting face of the pressure sleeve which is oriented in the direction of the pressure sleeve's open position. Specifically the transition between the internal circumference of the pressure sleeve and the abutting face has a radius or a chamfer. For example, the radius is between 1 mm and −2 mm, specifically 1.5 mm.

It is preferable that the inside diameter of the first shoulder of the inner body is smaller than the outside diameter of the second shoulder of the pressure sleeve, whereby the first shoulder and second shoulder at least partially overlap radially. It is thereby ensured that movement of the pressure sleeve in the direction of the valve tappet head can be limited by the first shoulder, whereby the force from the pressure sleeve upon the valve tappet head can be limited.

A further embodiment of the coupling element provides that the first limit stop and the second limit stop are distanced from one another at least in an unpressurized condition; uncoupled condition. It is preferable that the length of the pressure sleeve be chosen so that in a closed condition the pressure sleeve contacts the valve tappet head, wherein the first and second limit stops are simultaneously distanced from one another.

Increasing pressure within the flow channel leads to stretching of the valve tappet, particularly in the area of the shaft, and an expansion of the pressure sleeve, wherein beyond a specific threshold pressure value within the flow channel, both effects lead to the first limit stop and the second limit stop coming into contact with one another and to a partial transfer of force upon the inner body, taking place, whereby the force of the pressure sleeve upon the valve tappet head is limited. It is preferable that this threshold value lies within a range between operating pressure and four times operating pressure, specifically between 1.5 and 2 times operating pressure, wherein operating pressure ideally lies between 25 MPa and 40 MPa.

The first limit stop and the second limit stop are thus designed and arranged so that the force is limited, at least beyond a predetermined pressure within the flow channel, specifically a pressure between 35 MPa and 70 MPa. In this embodiment, the first limit stop and the second limit stop thus contact only after a predetermined pressure within the flow channel is exceeded. Before that, i.e. with lower pressure inside the flow channel, being below the threshold value, specifically below 35 MPa, the first limit stop is not in contact with the second limit stop, and the pressure sleeve is supported exclusively by the valve tappet head.

A further embodiment thus provides for the first limit stop and the second limit stop to contact at least at a predetermined pressure within the flow channel in the event of a pressure-related deformation of the valve tappet and/or the pressure sleeve. The pressure at which an elastic and/or plastic deformation of the components takes place varies depending upon the material of the valve tappet, the pressure sleeve, and the inner body. In any case, the materials are picked such way that beyond a predetermined pressure, the valve tappet and/or the pressure sleeve are deformed in such a way that the first limit stop and second limit stop come into contact, whereby the force upon the valve tappet head is limited. It is preferable that the deformation of the valve tappet, the pressure sleeve, and the inner body takes place in an elastic manner. Only in the event of an unintentional overload of the coupling element do the components deform in a plastic manner, which finally leads to leakage in the area between the pressure sleeve and the valve tappet head. As already described, this pressure is between the operating pressure and fourfold operating pressure, specifically between 1.5 and 2 times operating pressure.

A favorable seal between the pressure sleeve and the valve tappet head is achieved in a further embodiment in that the valve tappet head has a sealing surface and the sealing surface is pitched at angle $\alpha$ in relation to coupling axis A. It is preferable that angle $\alpha$ is between 0° and 45°. The sealing surface is a partial surface on the rearward side of the valve tappet head. Furthermore, the pressure sleeve has an opposing sealing surface, which is pitched at angle $\beta$ in relation to coupling axis A. It is preferable that angle β lies between 0° and 45°, specifically between 25° and 40°. The opposing sealing surface is at least in partial contact with the first sealing surface when the pressure sleeve is in its closed position, so that sealing takes place between the sealing surface and the opposing sealing surface. Specifically, the opposing sealing surfaces facilitate the transfer of forces parallel to coupling axis A from the pressure sleeve onto the valve tappet head. Furthermore, a seal is provided between the valve tappet head and the pressure sleeve which follows up the sealing surface and rests on the inner circumference of the pressure sleeve in the closed position.

Such a conical seal between the valve tappet head and the pressure sleeve has the advantage that even with a short stroke of the pressure sleeve, the flow channel is opened, which reduces the flow losses in the coupling. Additionally, the conical seal is simple and robust against tolerance variations. Another advantage is that the gap which is provided for a seal on the low-pressure side of the valve tappet head can be minimized or completely closed with a conical seal between the valve tappet head and the pressure sleeve, even when utilizing normal production tolerances.

A favorable seal can also be achieved when angles α and β are identical, i.e. the opposing sealing surface are angled identically so that the sealing surface and the opposing sealing surfaces rest at least partially flat against one another in the closed position. It is preferable that α and β have angles between 25° and 35° for this purpose, particularly 30°.

The sealing effect can also be increased when it is provided that α and β are different. It is preferable that α is smaller than β. Thus, the opposing sealing surface for example rests on an edge of the first sealing surface, with the result that tolerances are balanced and a gap on the low-pressure side is avoided. It is preferable that α is between 0° and 35° and β is between 30° and 45°. In a design in which the sealing surface extends parallel to coupling axis A, thus α=being 0° and β for example being 30°, the opposing sealing surface rests only on a circumferential edge of the sealing surface when in closed position.

The valve tappet can be advantageously mounted within the coupling element when it is provided in a further embodiment that the valve tappet is held in a tappet bearing on the housing, and that the tappet bearing includes at least two half-shells. The valve tappet has a circumferential groove on its shaft, into which the half-shells are at least partially inserted. Subsequently the valve tappet with the inset half-shells is mounted within the housing, specifically in such a manner that the valve tappet is held between the inner body and the connecting component.

It has also proven advantageous for operating safety if the tappet bearing is located in a groove on the valve tappet, wherein the groove has two opposing groove walls and a groove base. The groove walls are preferably oriented orthogonally to coupling axis A, and the groove base oriented parallel thereto. Between the groove base and at least one of the groove walls, i.e. in the transition area from the groove wall to the groove base, at least one chamfer with an angle γ to coupling axis A is formed. It is preferable that at least one chamfer is provided between the groove wall facing away from the valve tappet head and the groove base. It is preferable that angle γ is between 30° and 60°. It is especially preferable that the chamfer has angle γ of 35° with a width of 0.45 mm (35°×0.45). For example, a radius is provided between the groove wall on which there is no chamfer and the groove base.

Specifically it is also provided that at the transition from each of the two groove walls to the groove base, there is at least one chamfer with the angle γ to the coupling axis A or to the longitudinal axis of the valve tappet coinciding with coupling axis A.

Through the provision of this at least one chamfer, the tension in the groove base upon loading the valve tappet is considerably reduced, whereby operating safety is increased and/or operating parameters can be increased.

The tension in the groove base can be further reduced when it is provided in accordance with a further embodiment that additionally a second chamfer with an angle (δ) to coupling axis A is formed between at least one of the two groove walls and the groove base, and that the second chamfer originating from the groove wall connects to the first chamfer. Originating from the groove wall, the transition to the groove base is initially formed by the first chamfer and subsequently by the second chamfer. For example, the first chamfer and the second chamfer are provided on the groove wall facing away from the valve tappet head. It is preferable that angle γ of the first chamfer is greater than angle δ of the second chamfer. Specifically, angle δ is between 30° and 60°. Furthermore it is especially preferred to provide at least a third chamfer or at least a third chamfer and a fourth chamfer in the transitional region of the at least one groove wall to the groove base.

For example it is also provided that in the transitional region of both groove walls to the groove base, at least a first chamfer and at least a second chamfer are provided on each side.

The loss of pressure medium during the coupling process of a coupling with a coupling element can be easily reduced when it is provided that the coupling element is designed to be flat-sealing, that is all components of the coupling element on the second end of the coupling element lie in one plane. Thus the intrusion of dirt is prevented, cleaning of the coupling element is simplified, and the loss of pressure medium is minimized.

Particularly advantageous is the use of the coupling element in a coupling, especially a hydraulic coupling.

The initially cited objective is further met with an inventive valve tappet in that the valve tappet has a groove with two groove walls and a groove base, wherein at least a first chamfer is provided between at least one of the groove walls and the groove base.

BRIEF DESCRIPTION OF THE DRAWINGS

Specifically, there is now a plurality of possibilities for designing and further developing the coupling element. For this purpose it is referred to both, the claims subordinate to patent claims 1 and 15, and the subsequent description of the preferred embodiments in connection with the drawing. In the drawing it is shown in:

DETAILED DESCRIPTION OF EMBODIMENTS OF THE INVENTION

Figure 1:
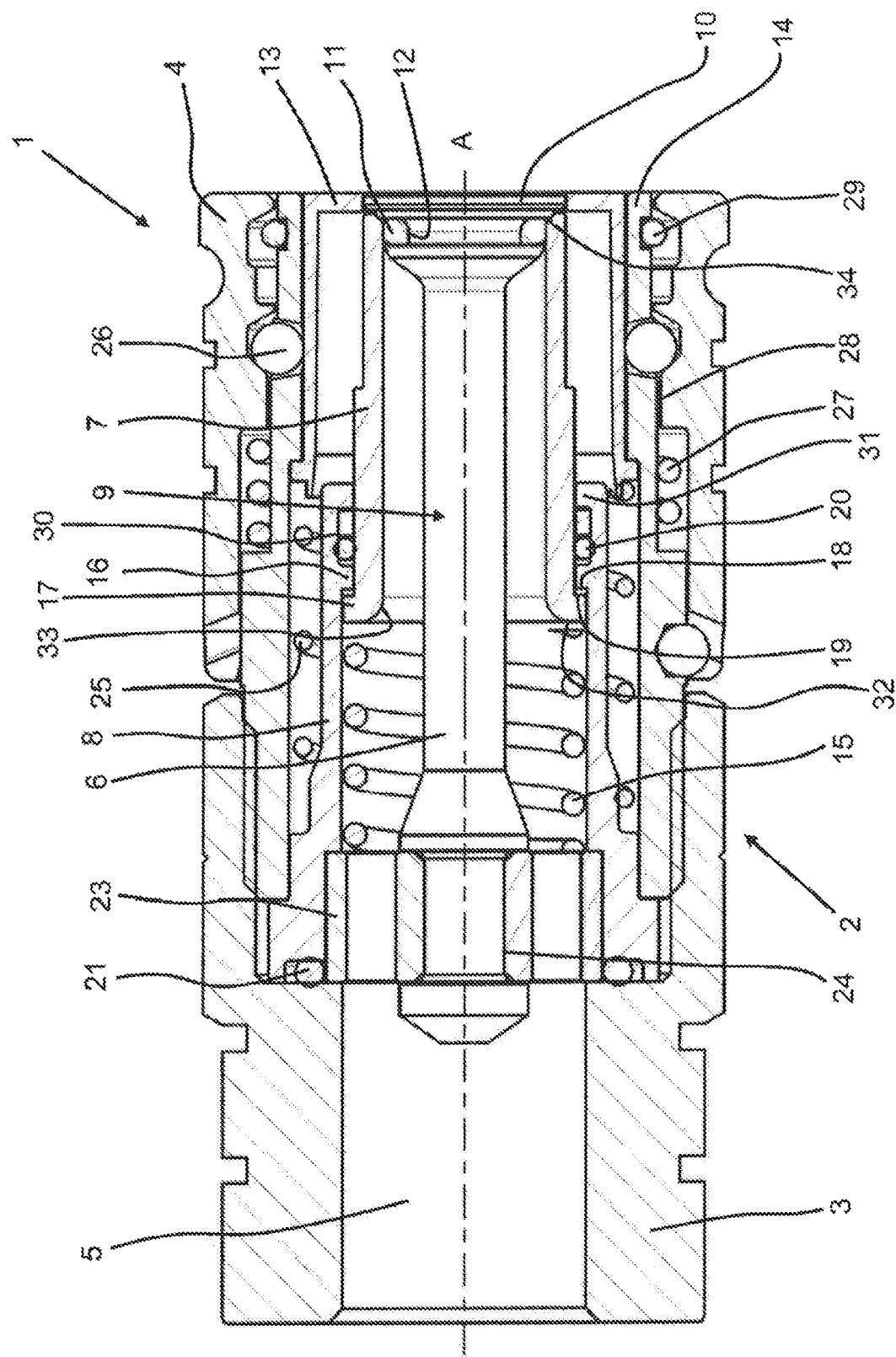
FIG. 1 An embodiment of a coupling element in a sectional side view.
Figure 2:
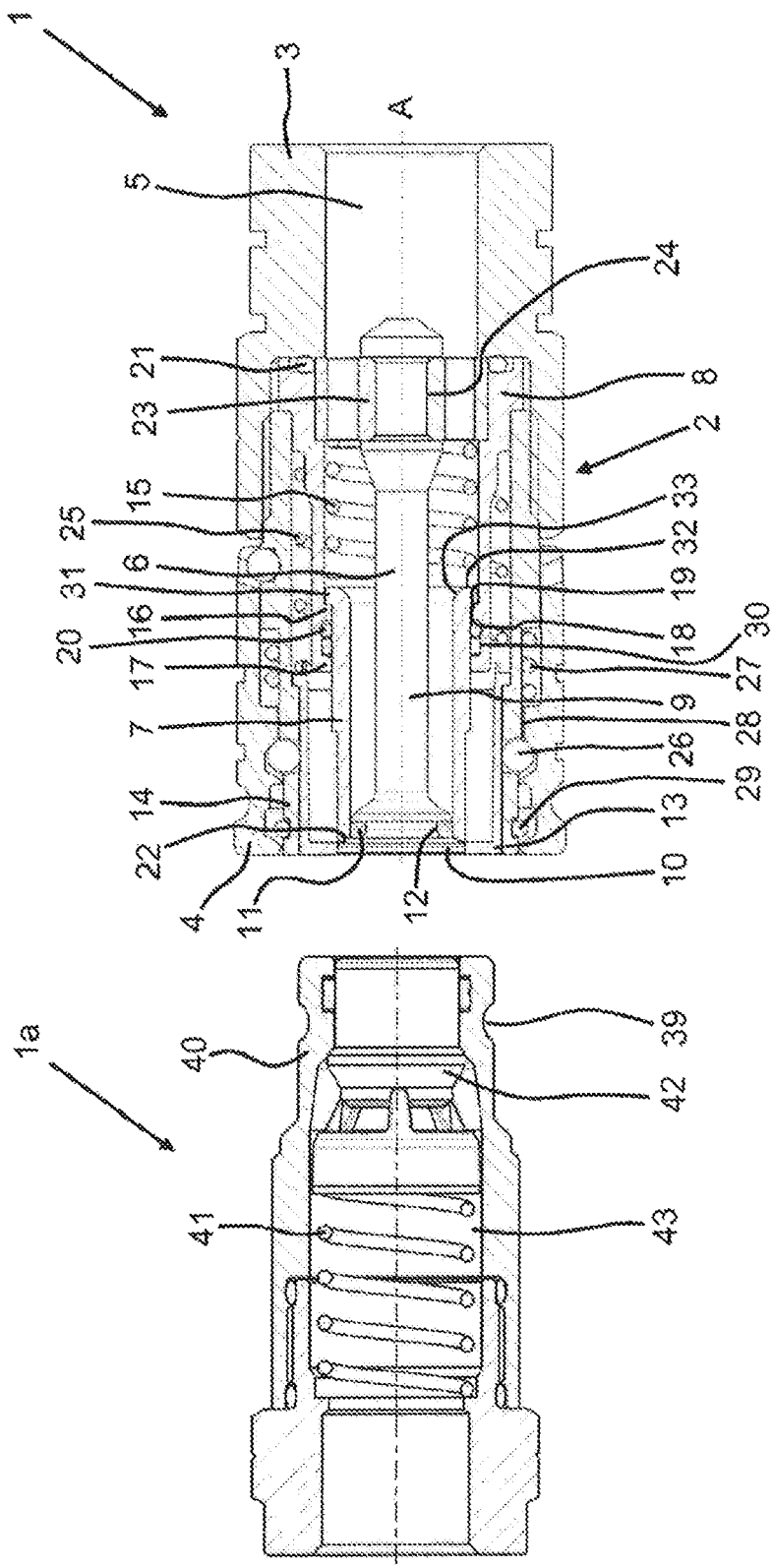
FIG. 2 The embodiment of the first coupling element according to FIG. 1 in another operating state, and an embodiment of a second coupling element in a sectional side view, FIG. 3a A section of the embodiment in accordance with FIG. 1 in the area of the valve tappet head, FIG. 3b A section of an embodiment of a coupling element in the area of the valve tappet head, FIG. 3c A section of an embodiment of a coupling element in the area of the valve tappet head, FIG. 4 A section of the embodiment in accordance with FIG. 1 in the area of the tappet guide, FIG. 5 A section of an embodiment of a valve tappet for a coupling element, FIG. 6a A section of an embodiment of a valve tappet for a coupling element, and FIG. 6b A section of an embodiment of a valve tappet for a coupling element.

FIG. 1 shows an embodiment of a coupling element 1, which is designed as a coupling sleeve. The coupling element 1 is part of a coupling for connecting pressure medium lines, in this example a hydraulic coupling. The shown coupling element 1, the coupling sleeve, serves to join with a corresponding second coupling element 1a; a coupling plug which is shown in FIG. 2, whereby two pressure medium lines, the one with the coupling sleeve and the one with the coupling plug, can be connected to one another.

The coupling element 1 comprises a housing 2, wherein the housing 2 includes a connecting component 3 as well as a sliding sleeve 4. The housing 2 limits at least partially a flow channel 5 for a pressure medium. Within the flow channel 5, a valve tappet 6 is centrally located. The valve tappet 6 is surrounded by a pressure sleeve 7. The pressure sleeve 7 is guided movably along a coupling axis A within an inner body 8.

The valve tappet 6 located centrally in the flow channel 5 has a valve tappet shaft 9 and a valve tappet head 10. The valve tappet head 10 is flared out in comparison to the valve tappet shaft 9, and thus has a larger diameter. The pressure sleeve 7 is supported within the inner body 8 in such a manner that the pressure sleeve 7 is movable along coupling axis A between a closed position, in which the flow channel 5 is closed by the pressure sleeve 7, and an open position, in which the flow channel 5 is opened by the pressure sleeve 7.

In the unpressurized closed position of the pressure sleeve 7, shown in FIG. 1, the pressure sleeve 7 is in contact with the valve tappet head 10, whereby a force parallel to coupling axis A from the pressure sleeve 7 acts upon the valve tappet head 10. Additionally, a seal 11 is arranged between the valve tappet head 10 and the pressure sleeve 7, which is located in a corresponding groove 12 in the valve tappet head 10. The valve tappet head 10 constitutes a part of the abutting face in the flat-sealing abutting face of the coupling element which is shown in FIG. 1 on the right. The flat-sealing abutting face of the coupling element 1 is further formed of a piston 13, a base body 14, and the sliding sleeve 4.

The pressure sleeve 7, which is movably supported within the inner body 8, is constantly pushed in the direction of its closed position by a compression spring 15, so that the pressure sleeve 7 is only movable out of its closed position against the force of the compression spring 15. The compression spring 15 also surrounds the valve tappet 6, when the pressure sleeve 7 is in contact with the valve tappet 6, specifically the valve tappet head 10, a force parallel to coupling axis A is exerted from the pressure sleeve 7 upon the valve tappet head 10. Specifically, this force composed of the force of the compression spring 15 and a pressure-dependent component, namely the effect of the pressurized pressure medium upon the sleeve line 7. Under very high pressures, the forces acting upon the valve tappet 6 can lead to damaging the valve tappet 6.

In order to prevent this, the inner body 8 and the pressure sleeve 7 have features with which the forces from the pressure sleeve 7 upon the valve tappet head 10 can be limited, namely a first circumferential shoulder 16 on the inner body 8 and a second circumferential shoulder 17 on the pressure sleeve 7. The first shoulder 16 forms a first limit stop and the second shoulder 17 forms a second limit stop. When the first shoulder 16 contacts the second shoulder 17, a transfer of force takes place from the pressure sleeve 7 to the inner body 8, by which the force from the pressure sleeve 7 acting upon the valve tappet head 10 is limited.

The second shoulder 17 is located in the end region of the pressure sleeve 7 that is oriented in the direction of its release position. The second shoulder 17 forms the abutting face 32 of the pressure sleeve 7 which is oriented in this direction. Between the inside circumference of the pressure sleeve 7 and the abutting face 32 is a radius 33 is formed, which improves the flow characteristics of the pressure sleeve 7.

In the unpressurized—no pressurized pressure medium in the flow channel—closed position of the coupling element 1, illustrated in FIG. 1 medium, the stop face 18 of the first shoulder 16 is spaced apart from the stop face 19 of the second shoulder 17 in a longitudinal direction, i.e. in a direction parallel to coupling axis A. As pressure within the flow channel 5 increases, among other parts the valve tappet shaft 9 stretches due to the pressurized pressure medium, whereby the pressure sleeve 7 expands. Due to these effects, the first stop face 18 of the first shoulder 16 comes into contact with the second stop face 19 of the second shoulder 17, whereby force is transferred from the pressure sleeve 7 to the inner body 8 and the force exerted by the pressure sleeve 7 upon the valve tappet head 10 is limited, in that a part of the force is dissipated by the inner body 8. This state is illustrated in FIG. 2 for example.

The force exerted by the pressure sleeve 7 upon the valve tappet head 10 is thus limited—particularly, it is distributed between the valve tappet head 10 and the inner body 8—in at least one operating state, particularly, starting from at least one threshold value for the pressure within the flow channel 5. As the first shoulder 16 and the second shoulder 17 are circumferential in form, the load transmission can advantageously be carried out via the entire ring face.

In its closed position, the pressure sleeve 7 contacts the valve tappet head with its conical opposing sealing surface 34, so that a conical seal is formed between the pressure sleeve 7 and the valve tappet head 10. The details of the system can be found in FIG. 3a and the associated description.

Furthermore, a seal 20 is placed between the pressure sleeve 7 and the inner body 8. The seal 20 is located in a groove 30, which is located on the inner body 8 between the first shoulder 16 and a sealing shoulder 31. The sealing shoulder 31 forms the abutting face of the inner body 8 which is oriented in the direction of the valve tappet head 10.

The inner body 8 is braced between the base body 14 and the connecting component 3, wherein a seal 21 is located between the inner body 8 and the connecting component 3.

The valve tappet 6 is supported on the housing 2 by a valve tappet bearing 23, specifically it is braced between the inner body 8 and the connecting component 3. The valve tappet bearing 23 includes two half-shells, which engage with a groove 24 on the valve tappet 6 and thus hold the valve tappet 6 centrally in the flow channel 5. The compression spring 15 for the pressure sleeve 7 is supported on the valve tappet bearing 23 in order to exert a force on the pressure sleeve 7 in the direction of its closed position. The details of a valve tappet 6 in the area of the valve tappet bearing 23 can be found in FIG. 4.

A piston spring 25 is located between the inner body 8 and the base body 14 which is screwed to the connecting component 3, which forces the piston 13 into its closed position in the flat-sealing abutting face of coupling element 1. In the closed position, the piston 13 blocks movement of the retaining balls 26, which thus block the sliding sleeve 4 in its open position. The sliding sleeve 4 is pressed against the retaining balls 26 by a sleeve spring 27.

When upon connecting the coupling element 1—here a coupling sleeve—a corresponding coupling element 1a, for example the coupling plug—(see FIG. 2) is inserted, the piston 13 is pushed against the force of the piston spring 25 into the interior of the coupling element 1, whereby movement of the retaining balls 26 is enabled. The retaining balls 26 then move into an outside circumferential groove 39; illustrated in FIG. 2; on the corresponding coupling element 1a. The sliding sleeve 4 thereby moves in the direction of its locked position, in which movement of the retaining balls 26 is in turn blocked by a locking area 28 of the sliding sleeve 4 in such a manner that a form-fit connection is made between the first coupling element 1 and the second coupling element 1a by the retaining balls 26. In the locked position, the sliding sleeve 4 contacts a blocking element, which is formed here as a circlip 29. The sliding sleeve 4 is always loaded by the sleeve spring 27.

FIG. 2 shows the embodiment of the first coupling element 1 in accordance with FIG. 1 in another operating state, namely in the state in which the first shoulder 16 of the inner body 8 and the second shoulder 17 of the pressure sleeve 7 have come into contact. In this operating condition, with a pressure of about 40 MPa being present, the force from the pressure sleeve 7 upon the valve tappet head 10 is limited by the first shoulder 16 and the second shoulder 17, in that a part of the force is transferred to the inner body 8. In FIG. 2 the first shoulder 16 and the second shoulder 17 are in flat contact with one another.

Furthermore, FIG. 2 shows a an embodiment of a second coupling element 1a, which here is designed as a coupling plug. The second coupling element 1a includes a plug body 40, in which a plunger 42 loaded with a spring 41 is located. An outside circumferential groove 39 is located on the plug body 40, which interacts with the retaining balls 26 of the first coupling element 1. In the state illustrated, the plunger 42 closes the flow channel 43. The second coupling element 1a can be inserted into the first coupling element 1, in that the plug body 40 is inserted into the first coupling element 1 in such a manner that the piston 13 is pushed into the interior of the first coupling element 1 against the force of the piston spring 25, wherein beyond a certain position the pressure sleeve 7 is pushed by the piston 13 in the direction of its open position.

In the operating state of the first coupling element 1 shown in FIG. 2, however, insertion of the second coupling element 1a would be impossible, as the pressure in the flow channel 5 is too high.

Figure 3A:
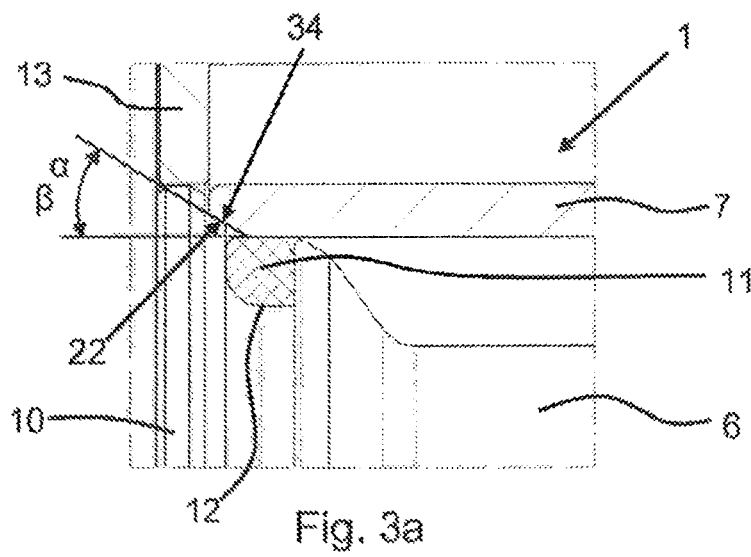

FIG. 3a shows a section of the embodiment according to FIG. 1 in the area of the valve tappet head 10. The valve tappet head 10 has a sealing surface 22, which is pitched at an angle α of 30° in relation to coupling axis A. Furthermore, the pressure sleeve 7 has an opposing sealing surface 34, which is also pitched at an angle β of 30° in relation to coupling axis A. The opposing sealing surface 34 is thus formed as a chamfer on the pressure sleeve 7. Due to the sealing surface 22 and the opposing sealing surface 34 having an identical angle towards coupling axis A, the pressure sleeve 7 in the illustrated closed position rests with the sealing surface 34 at least partially flat on sealing surface 22, whereby a force in longitudinal direction is directly transferred from the pressure sleeve 7 to the valve tappet head 10. For sealing, the seal 11 is further provided, which is located in a groove 12 in the valve tappet head 10 of the valve tappet 6.

Figure 3B:
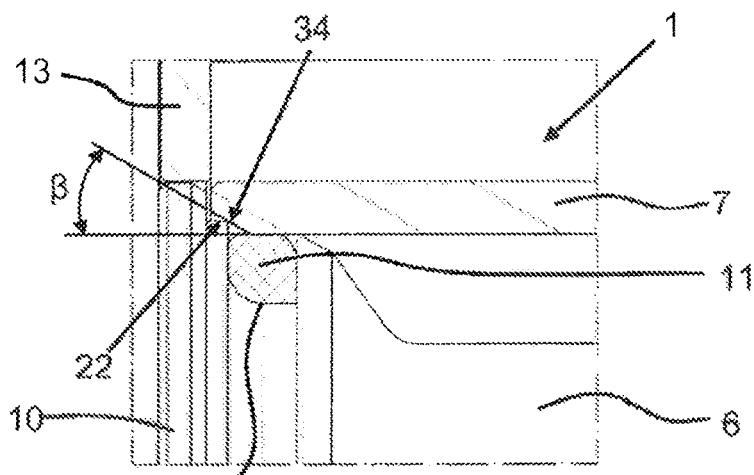

FIG. 3b shows a section of embodiment of a coupling element in the area of the valve tappet head 10. The sealing surface 22 has an inclination angle α of 0° (a in FIG. 3b is not depicted), so that the sealing surface 22 is oriented parallel to coupling axis A. The opposing sealing surface 34 of the pressure sleeve 7 has an angle β of 35° towards coupling axis A, so that in the shown closed position the pressure sleeve 7 abuts only an edge of sealing surface 22, whereby an advantageous sealing between the pressure sleeve 7 and the valve tappet head 10 is created. Further, for sealing, a seal 11 is provided in a groove 12 in the valve tappet head 10 of the valve tappet 6.

Figure 3C:
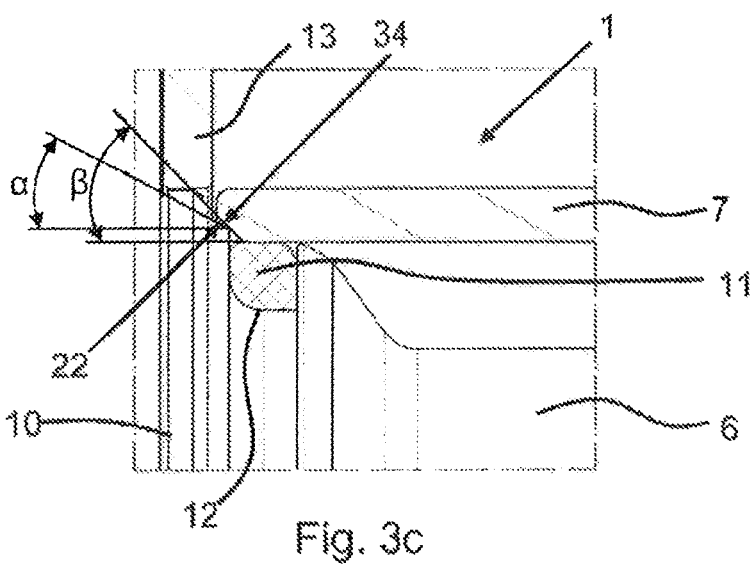

FIG. 3c shows a section of a further embodiment of a coupling element 1 in the area of the valve tappet head 10 of the valve head 6. The sealing surface 22 has an angle α of 30° towards coupling axis A, while the opposing sealing surface 34 has an angle β of 35° towards coupling axis A. In the shown closed state, of the pressure sleeve 7, the pressure sleeve 7 with its opposing sealing surface 34 thus only abuts against a circumferential edge of the sealing surface 22. Additionally, for further sealing, a seal 11 is provided in a groove 12.

Figure 4:
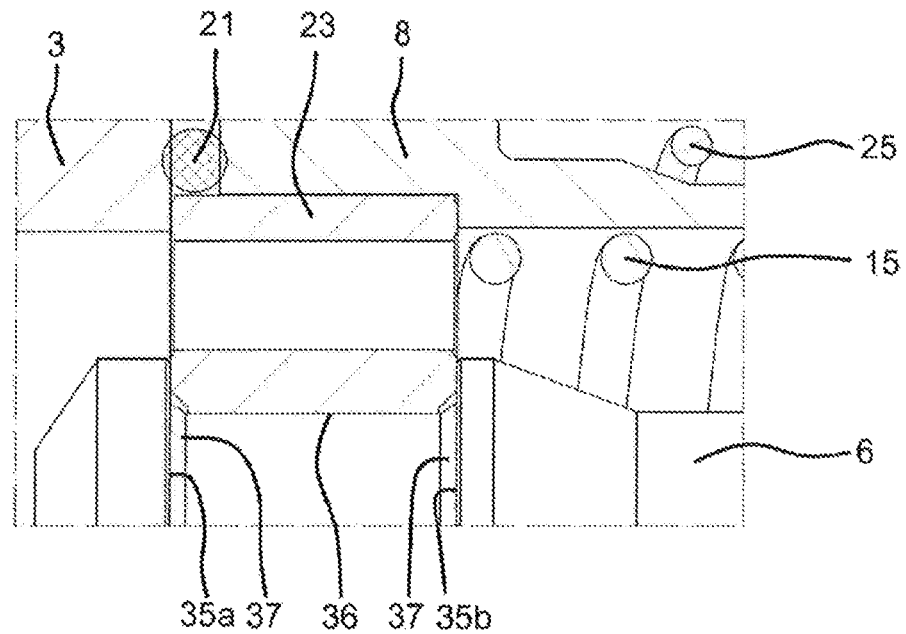

FIG. 4 shows a section of the embodiment according to FIG. 1 in the area of the groove 24 for attachment of the valve head 6. The tappet guide 23 is located in the groove 24. The tappet guide 23 is clamped between the inner body 8 and the connecting component 3. The seal 21 is located between the inner body 8 and the connecting component. The groove 24 has two opposing groove walls 35a and 35b, which merge into the groove base 36 via a first chamfer 37. Due to the first chamfer 37, the tension on the groove base 36 in operating state is considerably reduced, whereby operating safety is increased. The first chamfer 37 is inclined—in the present case contrariwise—at an angle of about 35° towards coupling axis A, respectively, and has a width of 0.45 mm.

Figure 5:
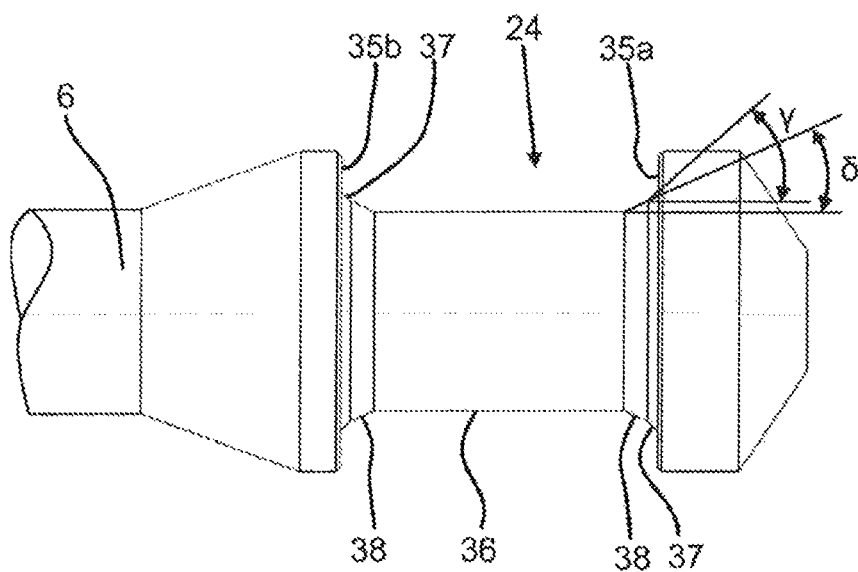

FIG. 5 shows embodiment of a valve tappet 6 for a coupling element 1. The groove 24 with its opposing groove walls 35a and 35b as well as the groove base 36 is depicted. Adjacent to the first chamfer 37 in the transition between the groove walls 35a and 35b respectively, a second chamfer 38 is arranged, which directly connects to the first chamfer 37. The first chamfer 37 and the second chamfer 38 have different angles of inclination to coupling axis A. The first chamfer 37 has an angle γ of 45° to coupling axis A, while the second chamfer 38 has an angle δ of 30° to coupling axis A.

Figure 6A:
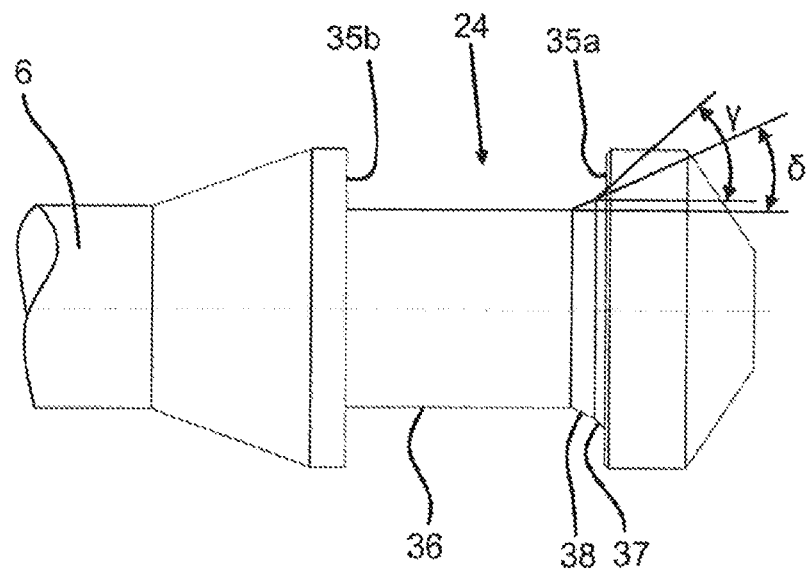

FIG. 6a shows an embodiment of a valve tappet 6 for a coupling element 1. The groove 24 with its opposing groove walls 35a and 35b as well as the groove base 36 is depicted. In the transition between the groove wall 35a facing away from the valve tappet head 10 (not shown in FIG. 6a) a second chamfer 38 is arranged adjacent to the first chamfer 37, the second chamfer connecting directly to the first chamfer 37. The first chamfer 37 and the second chamfer 38 have different angles of inclination relative to coupling axis A or rather to the longitudinal axis of the valve tappet coinciding with it. The first chamfer 37 has an angle γ of 45° to coupling axis A, while the second chamfer 38 has an angle δ of 30° to coupling axis A.

Figure 6B:
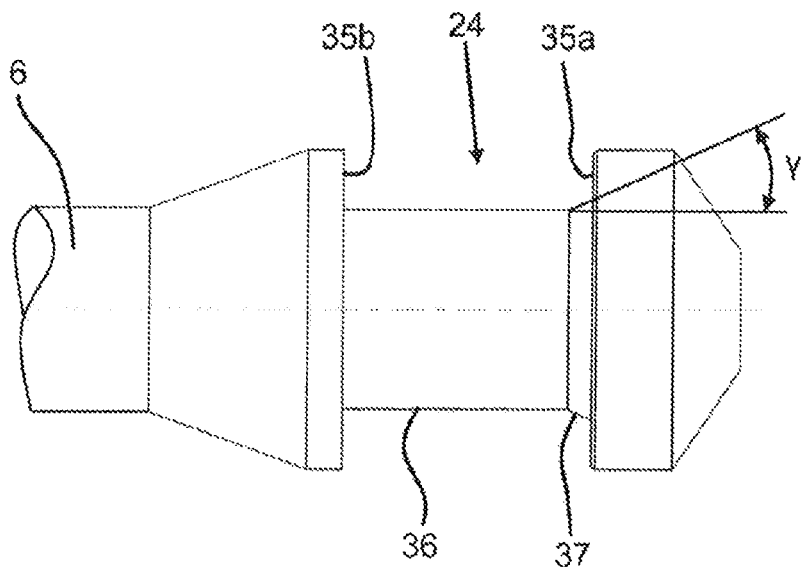

FIG. 6b shows an embodiment of a valve tappet 6 for a coupling element 1. The groove 24 with its opposing groove walls 35a and 35b as well as the groove base 36 is depicted. In the transition between the groove wall 35a facing away from the valve tappet head 10 (not shown in FIG. 6a but located on the left hand side) a first chamfer 37 with an angle γ is located. The first chamfer 37 has an angle γ of 45° to coupling axis A or rather to the longitudinal axis of the valve tappet 6 coinciding with it.

While the above description constitutes the preferred embodiment of the present invention, it will be appreciated that the invention is susceptible to modification, variation and change without departing from the proper scope and fair meaning of the accompanying claims.

The invention claimed is:

1. A coupling element for a coupling for connection of pressure medium lines, comprising a housing, a flow channel for a pressure medium, a valve tappet, a pressure sleeve and an inner body, wherein the housing has a coupling axis A, wherein the valve tappet is mounted in the housing such that the valve tappet is arranged in the flow channel, wherein the valve tappet has a valve tappet head, wherein the pressure sleeve surrounds the valve tappet, wherein the pressure sleeve is held in a movable configuration along the coupling axis A between a closed position, in which the flow channel is closed by the pressure sleeve, and an open position, in which the flow channel is opened by the pressure sleeve, wherein the pressure sleeve is in sealing contact with the valve tappet head when in the closed position, wherein a force from the pressure sleeve parallel to the coupling axis A acts upon the valve tappet head urging the tappet head into the sealing contact with the pressure sleeve, further comprising wherein the inner body or the pressure sleeve has means for limiting the force from the pressure sleeve upon the valve tappet head.

2. The coupling element in accordance with claim 1, further comprising the means for limiting the force is formed as a first limit stop on the inner body, and as a second limit stop on the pressure sleeve, wherein the first limit stop and the second limit stop interact for limiting the force.

3. The coupling element in accordance with claim 2, further comprising, the first limit stop is formed as a first shoulder on the inner body and the second limit stop is formed as a second shoulder on the pressure sleeve.

4. The coupling element in accordance with claim 3, further comprising, an inside diameter of the first shoulder of the inner body is smaller than an outer diameter of the second shoulder of the pressure sleeve.

5. The coupling element in accordance with claim 2, further comprising, the first limit stop and the second limit stop make contact at least beyond a predetermined pressure within the flow channel due to a pressure-related deformation of the valve tappet or the pressure sleeve.

6. The coupling element in accordance with claim 1, further comprising, the valve tappet head has a sealing surface that is tilted at an angle α to the coupling axis A, that the pressure sleeve has an opposing sealing surface, that the opposing sealing surface is titled at an angle β to the coupling axis A, that the opposing sealing surface at least partially contacts the sealing surface in the closed position of the pressure sleeve, and that the angles α and β each lie between 0° and 45°.

7. The coupling element in accordance with claim 6, further comprising, the angles α and β are identical, and the angles α and β lie between 25° and 35°.

8. The coupling element in accordance with claim 6, further comprising, that the angles α and β are different, and the angle α is between 0° and 35°, and the angle β is between 30° and 45°.

9. A hydraulic coupling, with a first coupling element, and a second coupling element, wherein the first coupling element armor the second coupling element are formed in accordance with claim 1.

10. A coupling element for a coupling for connection of pressure medium lines, comprising a housing, a flow channel for a pressure medium, a valve tappet, a pressure sleeve and an inner body, wherein the housing has a coupling axis A, wherein the valve tappet is mounted in the housing such that the valve tappet is arranged in the flow channel, wherein the valve tappet has a valve tappet head, wherein the pressure sleeve surrounds the valve tappet, wherein the pressure sleeve is held in a movable configuration along the coupling axis A between a closed position, in which the flow channel is closed by the pressure sleeve, and an open position, in which the flow channel is opened by the pressure sleeve, wherein the pressure sleeve is in at least indirect contact with the valve tappet head when in the closed position, wherein a force from the pressure sleeve parallel to the coupling axis A acts upon the valve tappet head, further comprising wherein the inner body or the pressure sleeve has means for limiting the force from the pressure sleeve upon the valve tappet head, the means is formed as a first limit stop on the inner body, and as a second limit stop on the pressure sleeve, wherein the first limit stop and the second limit stop interact for limiting the force, the first limit stop and the second limit stop are spaced apart from one another at least in an unpressurized closed position of the pressure sleeve.

11. A coupling element for a coupling for connection of pressure medium lines, comprising a housing, a flow channel for a pressure medium, a valve tappet, a pressure sleeve and an inner body, wherein the housing has a coupling axis A, wherein the valve tappet is mounted in the housing such that the valve tappet is arranged in the flow channel, wherein the valve tappet has a valve tappet head, wherein the pressure sleeve surrounds the valve tappet, wherein the pressure sleeve is held in a movable configuration along the coupling axis A between a closed position, in which the flow channel is closed by the pressure sleeve, and an open position, in which the flow channel is opened by the pressure sleeve, wherein the pressure sleeve is in at least indirect contact with the valve tappet head when in the closed position, wherein a force from the pressure sleeve parallel to the coupling axis A acts upon the valve tappet head, further comprising wherein the inner body or the pressure sleeve has means for limiting the force from the pressure sleeve upon the valve tappet head, further comprising, the valve tappet is held on the housing by a tappet bearing, and that the tappet bearing comprises at least two half-shells.

12. The coupling element in accordance with claim 11, further comprising, the tappet bearing is located in a groove on the valve tappet, that the groove has two opposing groove walls and a groove base, and that between at least one of the groove walls and the groove base there is at least a first chamfer forming having an angle γ to the coupling axis A, and the angle γ is between 30° and 60°.

13. The coupling element in accordance with claim 12, further comprising, between at least one groove wall of the two groove walls and the groove base, additionally at least one second chamfer is formed having an angle δ to the coupling axis A, and that the second chamfer emanating from the groove wall connects to the first chamfer, and the angle δ is between 30° and 60°.

14. The coupling element in accordance with claim 1, further comprising, the coupling element is formed as a coupling sleeve or as a coupling plug.

15. A coupling element for a coupling for connection of pressure medium lines, comprising a housing, a flow channel for a pressure medium, a valve tappet, a pressure sleeve and an inner body, wherein the housing has a coupling axis A, wherein the valve tappet is mounted in the housing such that the valve tappet is arranged in the flow channel, wherein the valve tappet has a valve tappet head, wherein the pressure sleeve surrounds the valve tappet, wherein the pressure sleeve is held in a movable configuration along the coupling axis A between a closed position, in which the flow channel is closed by the pressure sleeve, and an open position, in which the flow channel is opened by the pressure sleeve, wherein the pressure sleeve is in at least indirect contact with the valve tappet head when in the closed position, wherein a force from the pressure sleeve parallel to the coupling axis A acts upon the valve tappet head, further comprising wherein the inner body or the pressure sleeve has means for limiting the force from the pressure sleeve upon the valve tappet head, with the valve tappet having a valve tappet shaft, wherein a groove is provided in the valve tappet shaft for receiving a tappet bearing, wherein the groove has two opposing groove walls and a groove base, between at least one of the groove walls and the groove base there is at least a first chamfer with an angle γ to the longitudinal axis A of the valve tappet, the angle γ is between 30° and 60°.

16. The valve tappet for coupling element in accordance with claim 15, further comprising, between the at least one groove wall of the two groove walls and the groove base, at least one second chamfer with an angle δ to the coupling axis A is formed, and that the second chamfer emanating from the groove wall connects to the first chamfer, and the angle δ is between 30° and 60°.

* * * * *